United States Patent
Zeltser et al.

(10) Patent No.: US 8,670,218 B1
(45) Date of Patent: Mar. 11, 2014

(54) CURRENT-PERPENDICULAR-TO-THE-PLANE (CPP) MAGNETORESISTIVE (MR) SENSOR WITH HARD MAGNET BIASING STRUCTURE HAVING A MGO INSULATING LAYER

(71) Applicant: HGST Netherlands B.V., Amsterdam (NL)

(72) Inventors: Alexander M. Zeltser, San Jose, CA (US); Stefan Maat, San Jose, CA (US); Ning Shi, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/688,051

(22) Filed: Nov. 28, 2012

(51) Int. Cl.
*G11B 5/39* (2006.01)

(52) U.S. Cl.
USPC ...................................................... 360/324.2

(58) Field of Classification Search
USPC ...................................................... 360/324.2
See application file for complete search history.

(56) References Cited

U.S. PATENT DOCUMENTS

| | | | |
|---|---|---|---|
| 6,353,318 B1 | 3/2002 | Sin et al. | |
| 7,327,540 B2 | 2/2008 | Li et al. | |
| 7,911,741 B2 * | 3/2011 | Bhatia et al. | 360/235.3 |
| 8,218,270 B1 | 7/2012 | Zeltser et al. | |
| 8,462,461 B2 * | 6/2013 | Braganca et al. | 360/125.3 |
| 8,462,469 B1 * | 6/2013 | Kanaya et al. | 360/324.12 |
| 2010/0002336 A1 | 1/2010 | Sun et al. | |

* cited by examiner

*Primary Examiner* — Mark Blouin
(74) *Attorney, Agent, or Firm* — Thomas R. Berthold (57) ABSTRACT

A hard magnet biasing structure for a CPP-GMR or CPP-TMR read head for a magnetic recording disk drive is located between the two sensor shields and abutting the side edges of the sensor free layer. The biasing structure includes a crystalline MgO insulating layer on the lower shield and the side edges of the free layer, a seed layer of either Ir or Ru on and in contact with the MgO layer, a layer of at least partially chemically-ordered ferromagnetic FePt alloy hard bias layer on the seed layer, and a capping layer on the FePt alloy hard bias layer. The MgO layer may be a single layer on and in contact with the side edges of the free layer, or an upper layer on and in contact with a base insulating layer selected from an aluminum oxide, a tantalum oxide, a titanium oxide, and a silicon nitride.

19 Claims, 7 Drawing Sheets

CURRENT-PERPENDICULAR-TO-THE-PLANE (CPP) MAGNETORESISTIVE (MR) SENSOR WITH HARD MAGNET BIASING STRUCTURE HAVING A MGO INSULATING LAYER

BACKGROUND OF THE INVENTION

1. Field of the Invention

The invention relates generally to a current-perpendicular-to-the-plane (CPP) magnetoresistive (MR) sensor that operates with the sense current directed perpendicularly to the planes of the layers making up the sensor stack, and more particularly to a CPP MR sensor with an improved hard magnet biasing structure for longitudinally biasing the sensor free layer.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu). One ferromagnetic layer adjacent the spacer layer has its magnetization direction fixed, such as by being pinned by exchange coupling with an adjacent antiferromagnetic layer, and is referred to as the reference layer. The other ferromagnetic layer adjacent the spacer layer has its magnetization direction free to rotate in the presence of an external magnetic field and is referred to as the free layer. With a sense current applied to the sensor, the rotation of the free-layer magnetization relative to the reference-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP MR sensor is a magnetic tunnel junction sensor, also called a tunneling MR or TMR sensor, in which the nonmagnetic spacer layer is a very thin nonmagnetic tunnel barrier layer. In a CPP-TMR sensor the tunneling current perpendicularly through the layers depends on the relative orientation of the magnetizations in the two ferromagnetic layers. In a CPP-GMR read head the nonmagnetic spacer layer is formed of an electrically conductive material, typically a metal such as Cu. In a CPP-TMR read head the nonmagnetic spacer layer is formed of an electrically insulating material, such as $TiO_2$, MgO or $Al_2O_3$.

The sensor stack in a CPP MR read head is located between two shields of magnetically permeable material that shield the read head from recorded data bits on the disk that are neighboring the data bit being read. The sensor stack has an edge that faces the disk with a width referred to as the track width (TW). The sensor stack has a back edge recessed from the edge that faces the disk, with the dimension from the disk-facing edge to the back edge referred to as the stripe height (SH). The sensor stack is generally surrounded at the TW edges and back edge by insulating material.

A layer of hard or high-coercivity ferromagnetic material is used as a "hard bias" layer to stabilize the magnetization of the free layer longitudinally via magneto-static coupling. The hard bias layer is deposited as an abutting junction onto an insulating layer on each side of the TW edges of the sensor. The hard bias layer is required to exhibit a generally in-plane magnetization direction with high anisotropy ($K_u$) and thus high coercivity ($H_c$) to provide a stable longitudinal bias that maintains a single domain state in the free layer so that the free layer will be stable against all reasonable perturbations while the sensor maintains relatively high signal sensitivity. The hard bias layer must have sufficient in-plane remanent magnetization ($M_r$), which may also be expressed as $M_r \cdot t$ since $M_r$ is dependent on the thickness (t) of the hard bias layer. $M_r \cdot t$ must be high enough to assure a single magnetic domain in the free layer but not so high as to prevent the magnetic field in the free layer from rotating under the influence of the magnetic fields from the recorded data bits. High $M_r \cdot t$ is important because it determines the total flux that emanates from the hard bias layer towards the free layer for a given SH. As t decreases with smaller shield-to-shield spacing it is even more important to have high $M_r$. Moreover, to achieve a high $M_r$, a hard bias material with both a high saturation magnetization ($M_s$) and high squareness (S) is desired, i.e., $S=M_r/M_s$ should approach 1.0.

The conventional hard bias layer is typically a CoPt or CoPtCr alloy with $H_c$ typically less than about 2000 Oe. The desired magnetic properties are achieved by a seed layer or layers directly below the hard bias layer, such as seed layers of CrMo, CrTi and TiW alloys, and bilayers, including NiTa/CrMo and Ta/W bilayers. US 2010/0002336 A1 describes a hard biasing structure of an insulating layer, a MgO layer on the insulating layer, a Cr-containing seed layer on the MgO layer and a CoPt hard bias layer on the Cr-containing seed layer. The MgO seed layer has a crystalline structure that allows for the epitaxial growth of the Cr-containing seed layer.

More recently a chemically-ordered FePt alloy based on the $L1_0$ phase has been proposed as the hard bias layer. The FePt alloy as deposited is a face-centered-cubic (fcc) disordered alloy with relatively low $K_u$ (approximately $10^5$ erg/cm$^3$), but after annealing is a chemically-ordered alloy with face-centered-tetragonal (fct) phase ($L1_0$ phase) yielding high $K_u$ (approximately $10^7$ erg/cm$^3$). However, the chemically-ordered $L1_0$ phase FePt alloy requires high-temperature deposition (>400° C.) or high-temperature annealing (>500° C.), which are not compatible with current recording head fabrication processes. US 2009/027493 A1 describes a FePt hard bias layer with a Pt or Fe seed layer and a Pt or Fe capping layer, wherein the Pt or Fe in the seed and capping layer and the FePt in the hard bias layer interdiffuse during annealing, with the annealing temperature being about 250-350° C. U.S. Pat. No. 7,327,540 B2 describes a FePtCu hard bias layer, with Cu being present up to about 20 atomic percent, wherein chemical ordering occurs at an annealing temperature of about 260-300° C. However, alloying FePt with nonmagnetic elements such as Cu is undesirable because it reduces $M_s$ and thus for a given S, it reduces $M_r$. U.S. Pat. No. 8,281,270 B1, issued Jul. 10, 2012 and assigned to the same assignee as this application, describes an FePt alloy hard magnet biasing layer on a Ir or Ru seed layer on an insulating layer of an aluminum oxide, a tantalum oxide, a titanium oxide, or a silicon nitride.

As the data density increases in magnetic recording disk drives, there is a requirement for a decrease in the read head dimensions, particularly the shield-to-shield spacing. Thus the hard biasing structure, i.e., the hard bias layer, its seed layer or layers, and the underlying insulating layer, should be as thin as possible while assuring magnetic stabilization of the free layer. For a given thickness of the hard biasing structure, a thinner insulating layer enables the use of a thicker hard bias layer, with correspondingly increased $M_r \cdot t$.

What is needed is a CPP MR sensor with an improved hard magnet biasing structure that has a thin insulating layer and a seed layer that enables a chemically-ordered $L1_0$ phase FePt alloy hard bias layer with improved values of coercivity ($H_c$) and squareness (S).

SUMMARY OF THE INVENTION

This invention relates to a hard magnet biasing structure for a magnetoresistive (MR) sensor, such as a CPP-GMR or CPP-TMR read head for a magnetic recording disk drive. The structure is located between the two sensor shields and abutting the side edges of the sensor free layer. The biasing structure includes a crystalline MgO insulating layer on the lower shield and the side edges of the free layer, a seed layer of either Ir or Ru on and in contact with the MgO layer, a layer of an at least partially chemically-ordered FePt alloy hard bias layer on the seed layer, and a capping layer on the FePt alloy hard bias layer. The MgO layer may be a single layer on and in contact with the side edges of the free layer, or an upper layer on and in contact with a base insulating layer selected from an aluminum oxide, a tantalum oxide, a titanium oxide, and a silicon nitride. The Ir or Ru seed layer has a thickness preferably equal to or greater than 10 Å and less than or equal to 25 Å. The FePt alloy has a face-centered-tetragonal structure with its c-axis generally in the plane of the layer. Prior to annealing the composition of the FePt alloy is $Fe_{(100-x)}Pt_x$ where x is atomic percent and is preferably greater than or equal to 43 and less than or equal to 48.

The crystalline MgO layer below the Ir or Ru seed layer improves the magnetic properties of the FePt hard bias layer, and also allows for a thinner insulating layer. This allows for the use of a thicker FePt hard bias layer to increase $M_r \cdot t$ and/or a thicker capping layer, if desired.

For a fuller understanding of the nature and advantages of the present invention, reference should be made to the following detailed description taken together with the accompanying figures.

DETAILED DESCRIPTION OF THE INVENTION

Figure 1:
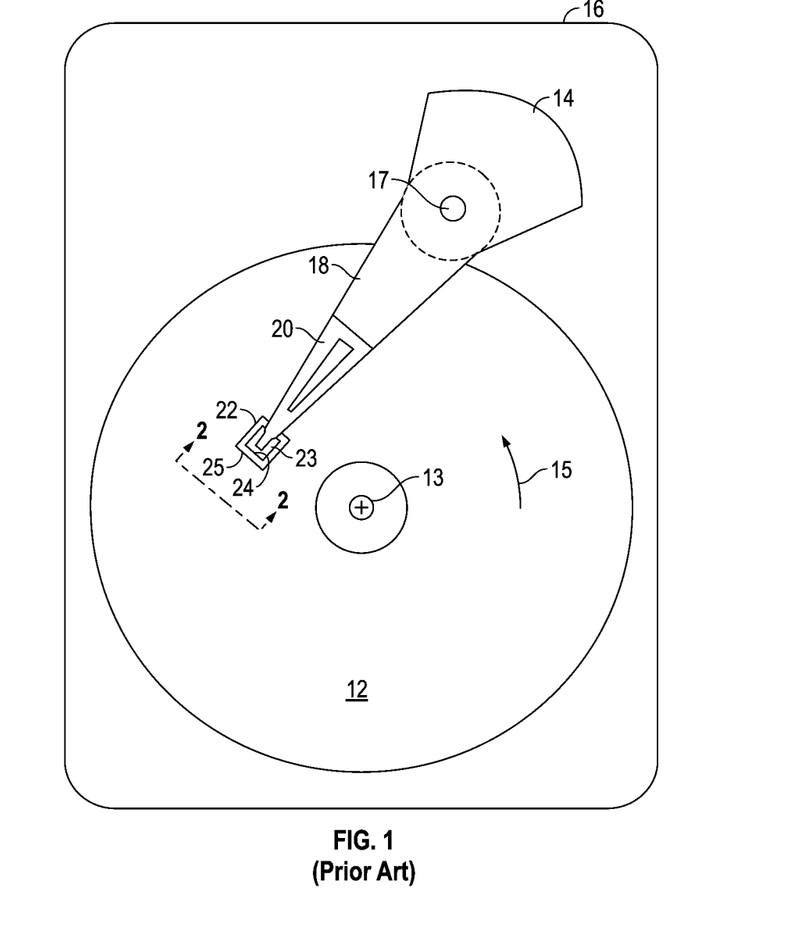
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
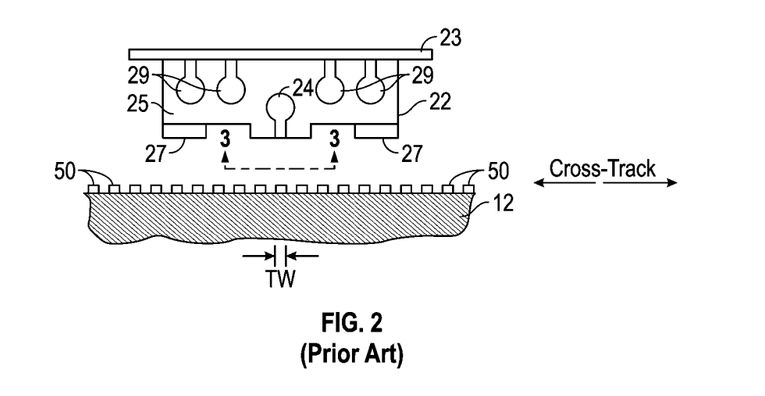
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 20 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
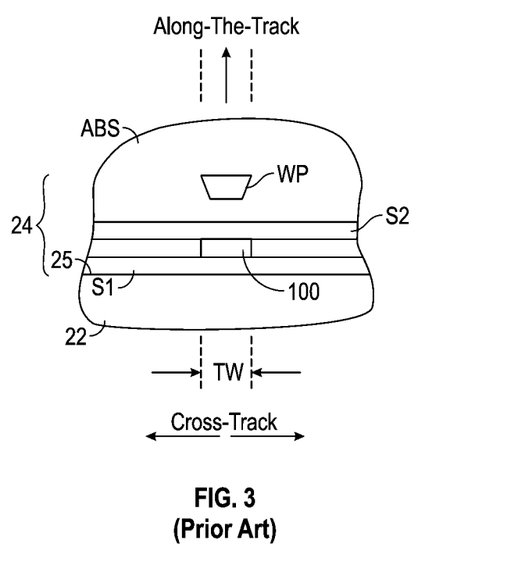
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP MR sensor or read head 100 is located between two magnetic shields S1 and S2. The shields S1, S2 are formed of magnetically permeable material, typically a NiFe alloy, and may also be electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as ruthenium, tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
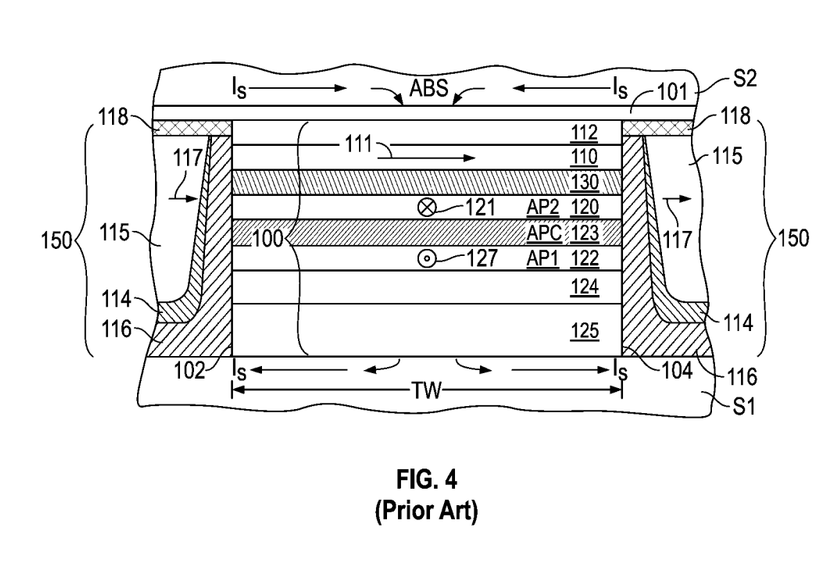
FIG. 4 is a cross-sectional schematic view of a CPP MR read head showing the stack of layers located between the magnetic shield layers.

FIG. 4 is view of the ABS showing the layers making up a prior art CPP MR sensor structure as would be viewed from the disk. FIG. 4 will be used to describe the prior art sensor structure as well as the sensor structure according to this invention. Sensor 100 is a CPP MR read head comprising a stack of layers formed between the two magnetic shield layers S1, S2. The sensor 100 has a front edge at the ABS and spaced-apart side edges 102, 104 that define the track width (TW). The shields S1, S2 are formed of electrically conductive material and thus may also function as electrical leads for the sense current $I_S$, which is directed generally perpendicularly through the layers in the sensor stack. Alternatively, separate electrical lead layers may be formed between the shields S1, S2 and the sensor stack. The lower shield S1 is typically polished by chemical-mechanical polishing (CMP) to provide a smooth substrate for the growth of the sensor stack. A seed layer 101, such as a thin Ru/NiFe bilayer, is deposited, typically by sputtering, below S2 to facilitate the electroplating of the relatively thick S2.

The sensor 100 layers include a reference ferromagnetic layer 120 having a fixed magnetic moment or magnetization direction 121 oriented transversely (into the page), a free ferromagnetic layer 110 having a magnetic moment or magnetization direction 111 that can rotate in the plane of layer 110 in response to transverse external magnetic fields from the disk 12, and a nonmagnetic spacer layer 130 between the reference layer 120 and free layer 110. The CPP MR sensor 100 may be a CPP GMR sensor, in which case the nonmagnetic spacer layer 130 would be formed of an electrically conducting material, typically a metal like Cu, Au or Ag. Alternatively, the CPP MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$.

The pinned ferromagnetic layer in a CPP MR sensor may be a single pinned layer or an antiparallel (AP) pinned structure. The pinned layer in the CPP GMR sensor in FIG. 4 is a well-known AP-pinned structure with reference ferromagnetic layer 120 (AP2) and a lower ferromagnetic layer 122 (AP1) that are antiferromagnetically coupled across an AP coupling (APC) layer 123. The APC layer 123 is typically Ru, Ir, Rh, Cr or alloys thereof. The AP1 and AP2 layers, as well as the free ferromagnetic layer 110, are typically formed of crystalline CoFe or NiFe alloys, amorphous or crystalline CoFeB alloys, or a multilayer of these materials, such as a CoFe/NiFe bilayer. The AP1 and AP2 ferromagnetic layers have their respective magnetization directions 127, 121 oriented antiparallel. The AP1 layer 122 may have its magnetization direction pinned by being exchange-coupled to an antiferromagnetic (AF) layer 124 as shown in FIG. 4. The AF layer 124 is typically a Mn alloy, e.g., PtMn, NiMn, FeMn, IrMn, PdMn, PtPdMn or RhMn. Alternatively, the AP-pinned structure may be "self-pinned" or it may be pinned by a hard magnetic layer such as $Co_{100-x}Pt_x$ or $Co_{100-x-y}Pt_xCr_y$ (where x is about between 8 and 30 atomic percent). Instead of being in contact with a hard magnetic layer, AP1 layer 122 by itself can be comprised of hard magnetic material so that it is in contact with an underlayer on one side and the nonmagnetic APC layer 123 on the other side. In a "self pinned" sensor the AP1 and AP2 layer magnetization directions 127, 121 are typically set generally perpendicular to the disk surface by magnetostriction and the residual stress that exists within the fabricated sensor. It is desirable that the AP1 and AP2 layers have similar moments. This assures that the net magnetic moment of the AP-pinned structure is small so that magnetostatic coupling to the free layer 110 is minimized and the effective pinning field of the AF layer 124, which is approximately inversely proportional to the net magnetization of the AP-pinned structure, remains high. In the case of a hard magnet pinning layer, the hard magnet pinning layer moment needs to be accounted for when balancing the moments of AP1 and AP2 to minimize magnetostatic coupling to the free layer. The AP-pinned structure minimizes the net magnetostatic coupling between the reference/pinned layers and the CPP MR free ferromagnetic layer. The AP-pinned structure, also called a "laminated" pinned layer, and sometimes called a synthetic antiferromagnet (SAF), is described in U.S. Pat. No. 5,465,185.

A seed layer 125 may be located between the lower shield layer S1 and the AP-pinned structure. If AF layer 124 is used, the seed layer 125 enhances the growth of the AF layer 124. The seed layer 125 is typically one or more layers of NiCr, NiFe, Ta, Cu, or Ru. A capping layer 112 is located between the free ferromagnetic layer 110 and the upper shield layer S2. The capping layer 112 provides corrosion protection and may be a single layer or multiple layers of different materials, such as Ru, Ta, Ti, or a Ru/Ta/Ru, Ru/Ti/Ru, or Cu/Ru/Ta trilayer.

In the presence of an external magnetic field in the range of interest, i.e., magnetic fields from recorded data on the disk, the magnetization direction 111 of free layer 110 will rotate while the magnetization direction 121 of reference layer 120 will remain fixed and not rotate. Thus when a sense current $I_S$ is applied from top shield S2 perpendicularly through the sensor stack to bottom shield S1 (or from S1 to S2), the magnetic fields from the recorded data on the disk will cause rotation of the free-layer magnetization 111 relative to the reference-layer magnetization 121, which is detectable as a change in electrical resistance.

A hard magnet biasing structure 150 is formed outside of the sensor stack near the side edges 102, 104 of the sensor 100, particularly near the side edges of free layer 110. The structure 150 includes a ferromagnetic biasing layer 115 with high crystalline anisotropy ($K_u$) and thus high coercivity ($H_c$) and is thus also called the "hard bias" layer. The structure 150 also includes a seed layer 114 below the biasing layer 115, an insulating layer 116 below the seed layer 114 and a capping layer 118 on the biasing layer 115. The seed layer 114 and biasing layer 115 are electrically insulated from side edges 102, 104 of sensor 100 by electrically insulating layer 116, which is typically alumina ($Al_2O_3$) but may also be a silicon nitride ($SiN_x$) or another metal oxide like a Ta oxide or a Ti oxide. The shield layer S1 serves as a substrate for the hard biasing structure 150. The seed layer 114 is deposited on the insulating layer 116. The biasing layer 115 has a magnetization 117 generally parallel to the ABS and thus longitudinally biases the magnetization 111 of the free layer 110. Thus in the absence of an external magnetic field the magnetization 117 of biasing layer 115 is parallel to the magnetization 111 of the free layer 110.

This invention is a CPP MR sensor like that described and shown in FIG. 4, but wherein the ferromagnetic biasing (hard bias) layer 115 is an at least partially chemically-ordered FePt $L1_0$ phase alloy, the seed layer 114 is a thin layer of iridium (Ir) or ruthenium (Ru), and the insulating layer 116 is a single layer of crystalline MgO or a multilayer of a base insulating layer and a crystalline MgO layer on the base layer. The capping layer 118 may be a thin layer of Ru or a bilayer of Ru/Ir.

Figure 5:
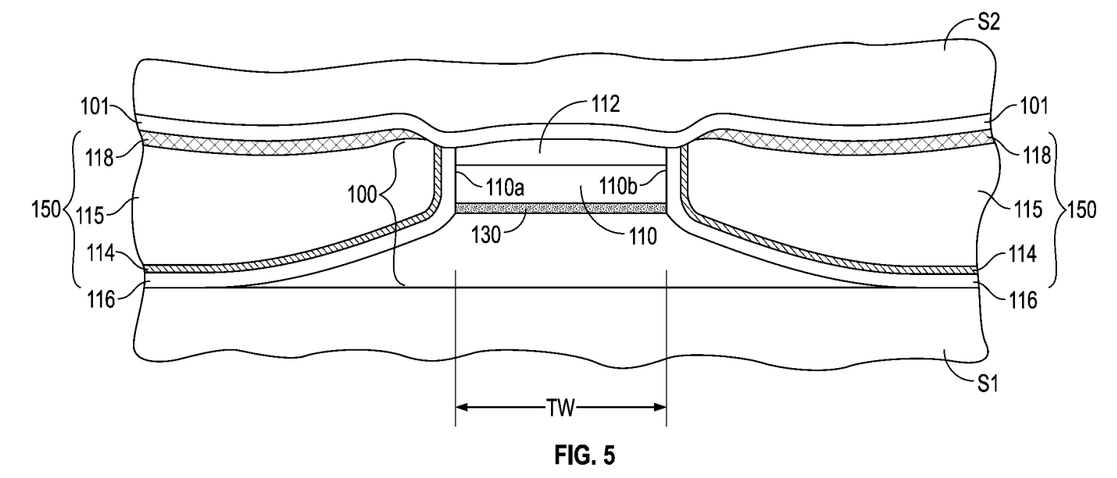
FIG. 5 is a line drawing based on a Scanning Transmission Electron Microscope (STEM) image of an actual sensor, and illustrates the hard magnet biasing structure with a MgO insulating layer according to this invention.

FIG. 5 is a line drawing based on a Scanning Transmission Electron Microscope (STEM) image of an actual sensor showing the hard biasing structure 150 according to the invention. The insulating layer 116 is crystalline MgO and is deposited on S1 and on the TW edges 110a, 110b of free layer 110. It may be preferable for insulating layer 116 to be thinner close to the TW edges of the free layer to get the hard bias layer 115 closer to the free layer for a higher effective biasing field, but thicker away from the free layer on S1 to obtain good insulating properties and avoid electrical shunting. A typical thickness of the MgO insulating layer 116, when it is a single layer of MgO, is about 15 to 30 Å close to the TW edges of the free layer and about 25 to 50 Å away from the free layer on S1. The MgO layer may be deposited by reactive ion beam deposition (IBD) from an Mg or MgO target in an oxygen ($O_2$) containing process gas. The MgO layer may also be deposited by reactive sputtering of a Mg target in an oxygen-argon atmosphere, or by sputtering from a MgO target. As deposited the MgO may be amorphous, but after anneal which is required to form the high crystal anisotropy FePt $L1_0$ phase in hard bias layer it may at least partially crystallize to form a NaCl type crystalline structure.

The seed layer 114 is a layer of Ir or Ru and is deposited on the MgO layer 116 by sputtering or ion-beam deposition (IBD) to a thickness between 5-40 Å, preferably between 10-25 Å. Ir seed layers have an fcc structure and Ru seed layers have a hexagonal-close-packed (hcp) structure. The hard bias layer 115 is a binary FePt alloy. The FePt is deposited by sputtering directly onto the seed layer 114 to a thickness between about 130-200 Å. As deposited, the FePt is a fcc disordered alloy with relatively low anisotropy ($K_u$) (approximately $10^5$ erg/cm$^3$). After annealing the FePt becomes an at least partially chemically-ordered $L1_0$ (fct) phase alloy. The FePt alloy may be equiatomic ($Fe_{50}Pt_{50}$), but generally $Fe_{(100-x)}Pt_x$, where x is between 43-48 atomic percent, has shown optimal values of $H_c$ and Mr·t when deposited on Ir or Ru seed layers. The capping layer 118 may be a layer of Ru or a bilayer of Ru/Ir deposited by sputtering or IBD directly on the hard bias layer 115 to a thickness between about 40-100 Å.

After deposition of the layers 116, 114, 115, 118, the structure 150 is annealed at a temperature of at least 270° C. for at least 5 hours. A higher annealing temperature generally requires a shorter annealing time. The annealing at least partially converts the FePt to a chemically-ordered alloy with $L1_0$ (fct) phase with high $K_u$ and thus high $H_c$ (greater than 3500 Oe) and with the easy axis of magnetization (the c-axis) oriented in the plane of the layer. The annealing also forms or improves the crystalline structure of the MgO layer 116. The annealing is done in the presence of a 5 Tesla magnetic field perpendicular to the ABS in order not to disturb the pinned layer magnetization direction, which had been already established during a separate sensor annealing step. However, the sensor annealing to establish the pinned layer magnetization direction could be done at the same time as the hard bias annealing.

Figure 6:
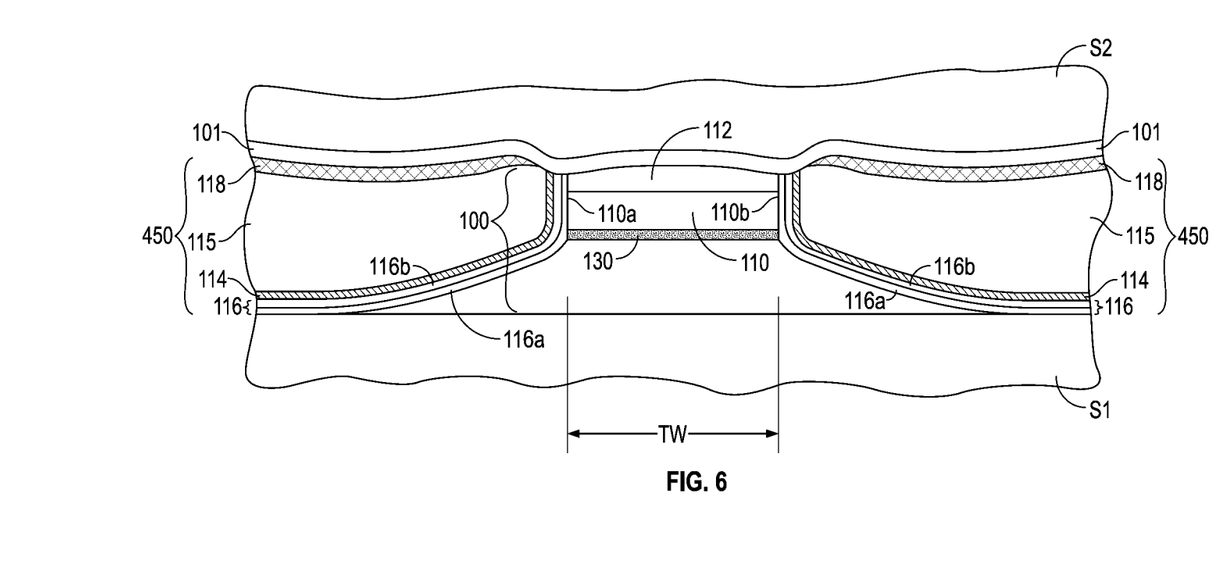
FIG. 6 is a line drawing based on a STEM image of an actual sensor, and illustrates the hard magnet biasing structure with a base insulating layer and a crystalline MgO insulating layer according to this invention.

In FIG. 5, the MgO layer 116 is a single layer in contact with the side edges 110a, 110b of the free layer 110 and with regions of the shield S1 adjacent the side edges. In FIG. 6, the hard biasing structure 450 according to the invention shows the insulating layer formed of a base insulating layer 116a with the MgO layer 116b formed on the base layer 116a. The base insulating layer 116a may be formed of an aluminum oxide, a tantalum oxide, a titanium oxide, or a silicon nitride. Silicon nitride is a preferred insulator over oxides because a sensor in contact with a silicon nitride insulating layer exhibits less side-damage or degradation of properties. Because it is difficult to form Si nitride with stoichiometric Si—N chemical bonds using conventional vacuum deposition techniques, its dielectric strength often suffers. As a result, in practice, MgO usually has a higher dielectric strength (the maximum electric field strength that it can withstand intrinsically without breaking down) than a silicon-nitrogen compound loosely defined as "silicon nitride" ($SiN_x$). Thus a much thinner insulating layer 116 can be deposited with MgO as compared to silicon nitride. For a given shield-to-shield (S1-to-S2) spacing, this allows the FePt hard bias layer 115 to be made thicker. For example, base insulating layer 116a may be a 30 Å $SiN_x$ layer and the MgO layer 116b may be 10 Å thick. As used herein to describe electrically insulating silicon nitride material for the base layer 116a, the terms "silicon nitride" and $SiN_x$ shall mean $Si_3N_4$ and deviations from this stoichiometry, including nitrogen-deficient silicon nitride with unsaturated dangling bonds of Si (commonly referred to as $SiN_x$) wherein the total amount of Si can be up to 50 atomic percent, i.e., equal amounts of Si and N. The silicon nitride layers are typically formed by ion beam deposition and are amorphous.

As the data density increases in magnetic recording disk drives, there is a requirement for a decrease in the read head dimensions, particularly the shield-to-shield (S1-to-S2) spacing. However, even as S1-to-S2 spacing is reduced it is desirable to maximize the remanence-thickness product ($M_r$·t) of hard bias layer 115 to assure magnetic stabilization of the free layer 110. This means that it is desirable to have the seed layer 114 and insulating layer 116 as thin as possible while still permitting growth of the hard bias layer 115 with adequate magnetic properties, such as $H_c$, $M_r$·t and squareness ($S=M_r/M_s$). Also it is desirable to have the seed layer 114 and insulating layer 116 as thin as possible to minimize free layer to hard bias layer spacing and thus to increase free layer stabilization due to increased magnetostatic coupling.

Figure 7A:
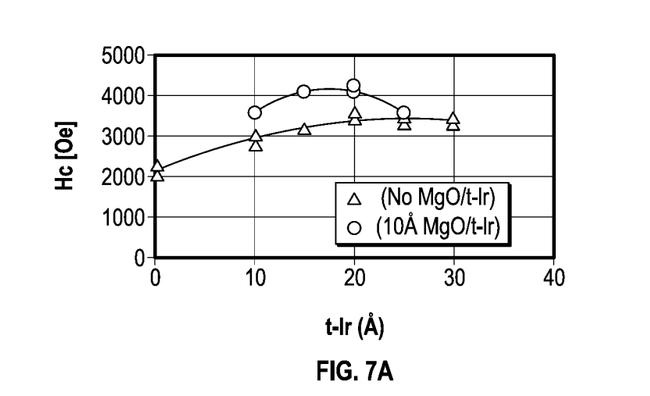
FIGS. 7A-7B are graphs comparing $H_c$ and $M_r/M_s$, respectively, as a function of Ir seed layer thickness (t) for hard magnet biasing structures with and without the MgO insulating layer.
Figure 7B:
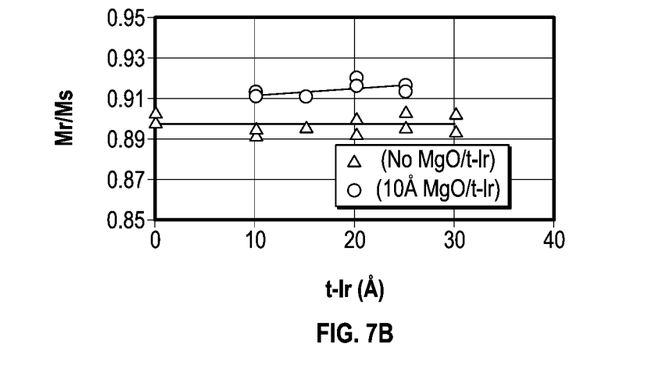

In this invention, the crystalline MgO insulating layer directly beneath the Ir or Ru seed layer improves the coercivity ($H_c$) and squareness ($M_r/M_s$) of the FePt hard bias layer. FIGS. 7A-7B are graphs comparing $H_c$ and $M_r/M_s$, respectively, as a function of Ir seed layer thickness (t) for hard magnet biasing structures with and without the MgO insulating layer. The hard biasing structure according to the invention was:

30 Å $SiN_x$/10 Å MgO/t-Ir(seed)/
170 Å $Fe_{56}Pt_{44}$(hard bias)/
60 Å Ru-20 Å Ir(capping).

The samples were annealed at 280° C. in a 5 Tesla field for 5 hours. FIG. 7A shows an increase in $H_c$ of about 500-800 Oe to above 3500 Oe for Ir thicknesses between about 10-20 Å. FIG. 7B shows an increase in $M_r/M_s$ from about 0.89-0.90 to about 0.90-0.91 for Ir thicknesses between about 10-25 Å.

Figure 8A:
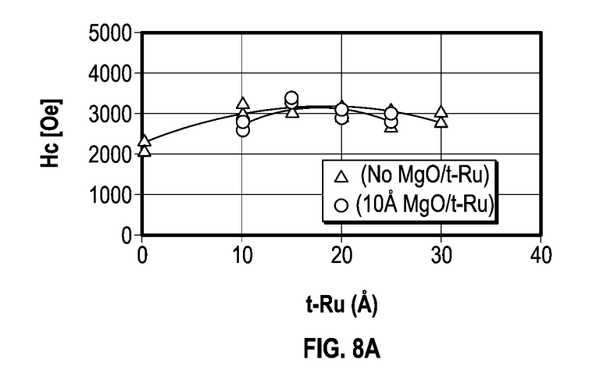
FIGS. 8A-8B are graphs comparing $H_c$ and $M_r/M_s$, respectively, as a function of Ru seed layer thickness (t) for hard magnet biasing structures with and without the MgO insulating layer.
Figure 8B:
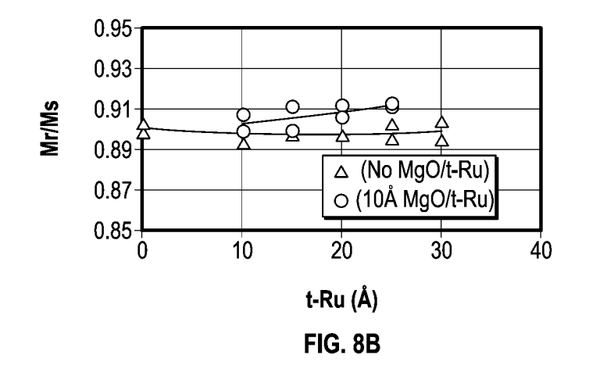

FIGS. 8A-8B are graphs comparing $H_c$ and $M_r/M_s$, respectively, as a function of Ru seed layer thickness (t) for hard magnet biasing structures with and without the MgO insulating layer. The hard biasing structure according to the invention was:

30 Å $SiN_x$/10 Å MgO/t-Ru(seed)/
170 Å $Fe_{56}Pt_{44}$(hard bias)/
60 Å Ru-20 Å Ir(capping).

The samples were annealed at 280° C. in a 5 Tesla field for 5 hours. FIG. 8A shows about the same values of $H_c$ for Ru thicknesses between about 10-25 Å. FIG. 8B shows an increase in $M_r/M_s$ from about 0.89-0.90 to about 0.90-0.91 for Ru thicknesses between about 10-25 Å.

In addition to providing improved magnetic properties for the FePt hard bias layer, as shown by FIGS. 7A-7B and 8A-8B, the crystalline MgO layer below the Ir or Ru seed layer also allows for a thinner insulating layer. For example, a 15 Å base layer of silicon nitride and a 10 Å MgO layer will achieve approximately the same level of insulation provided by a single 30 Å silicon nitride layer. This allows for the use of a thicker FePt hard bias layer to increase $M_r \cdot t$ and/or a thicker capping layer, if desired.

The MR sensor structure with the hard biasing structure according to this invention has been described above with respect to its application in a CPP GMR or TMR read head for a magnetic recording disk drive. However, the sensor structure is also applicable to other types of MR sensors, such as for use in automotive applications and as magnetometers.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor structure comprising:
   a substrate;
   a magnetoresistive sensor on the substrate and comprising a stack of layers including a ferromagnetic free layer, the free layer having a front edge and two spaced-apart side edges;
   an electrically insulating layer comprising a crystalline MgO layer on the side edges of the free layer and on regions of the substrate adjacent the sensor;
   a seed layer consisting of material selected from Ir and Ru on and in contact with the MgO layer;
   a layer of at least partially chemically-ordered ferromagnetic FePt alloy on and in contact with the seed layer, the FePt alloy having a face-centered-tetragonal structure with its c-axis generally in the plane of the layer; and
   a capping layer on and in contact with the FePt alloy layer.

2. The sensor structure of claim 1 wherein the electrically insulating layer consists of a single layer of MgO layer on and in contact with the side edges of the free layer and on and in contact with the regions of the substrate adjacent the sensor.

3. The sensor structure of claim 1 wherein the electrically insulating layer comprises a base layer selected from an aluminum oxide, a tantalum oxide, a titanium oxide, and a silicon nitride on and in contact with the side edges of the free layer and on and in contact with the regions of the substrate adjacent the sensor, and a layer of crystalline MgO on and in contact with said base layer.

4. The sensor structure of claim 3 wherein the base layer consists of silicon nitride.

5. The sensor structure of claim 1 wherein the seed layer has a thickness equal to or greater than 10 Å and less than or equal to 25 Å.

6. The sensor structure of claim 1 wherein the seed layer consists of Ir and wherein the FePt alloy layer has a coercivity $H_c$ greater than 3500 Oe.

7. The sensor structure of claim 1 wherein the FePt alloy layer has a ratio (S) of remanent magnetization ($M_r$) to saturation magnetization ($M_s$) greater than 0.90.

8. The sensor structure of claim 1 wherein the FePt alloy as deposited has a composition of the form $Fe_{(100-x)}Pt_x$, where x is atomic percent and is greater than or equal to 43 and less than or equal to 48.

9. The sensor structure of claim 1 wherein the capping layer consists of a Ru layer.

10. The sensor structure of claim 1 wherein the capping layer comprises a Ru layer on and in contact with the FePt alloy layer and an Ir layer on and in contact with the Ru layer.

11. The sensor structure of claim 1 wherein the total thickness of the capping layer is equal to or greater than 40 Å and less than or equal to 100 Å.

12. The sensor structure of claim 1 wherein the substrate is a first shield layer formed of magnetically permeable material and further comprising a second shield layer of magnetically permeable material on the sensor stack and capping layer.

13. The sensor structure of claim 1 wherein the sensor is a giant magnetoresistance (GMR) sensor.

14. The sensor structure of claim 1 wherein the sensor is a tunneling magnetoresistance (TMR) sensor.

15. A current-perpendicular-to-the-plane (CPP) magnetoresistive (MR) read head for a magnetic recording disk drive comprising:
    a substrate;
    a first shield layer of magnetically permeable material on the substrate;
    a sensor stack of layers including a ferromagnetic free layer on the first shield layer and having two spaced-apart side edges, the free layer having a magnetization free to rotate in the presence of magnetic fields from recorded data on the disk;
    an electrically insulating base layer on and in contact with the side edges of the free layer and on regions of the first shield layer adjacent the sensor stack, the base layer being selected from an aluminum oxide, a tantalum oxide, a titanium oxide, and a silicon nitride;
    a layer of crystalline MgO on and in contact with said base layer;
    a seed layer selected from a layer consisting of Ir and a layer consisting of Ru on and in contact with the MgO layer, the seed layer having a thickness equal to or greater than 10 Å and less than or equal to 25 Å;
    a layer of at least partially chemically-ordered ferromagnetic FePt alloy deposited on and in contact with the seed layer for biasing the magnetization of the free layer; and
    a capping layer selected from a layer of Ru and a bilayer of Ru and Ir with Ir being on the Ru layer; and
    a second shield layer of magnetically permeable material on the sensor stack and capping layer.

16. The read head of claim 15 wherein the base layer consists of silicon nitride.

17. The read head of claim 15 wherein the seed layer consists of Ir and wherein the FePt alloy layer has a coercivity $H_c$ greater than 3500 Oe.

18. The read head of claim 15 wherein the FePt alloy layer has a ratio (S) of remanent magnetization ($M_r$) to saturation magnetization ($M_s$) greater than 0.90.

19. The read head of claim 1 wherein the FePt alloy as deposited has a composition of the form $Fe_{(100-x)}Pt_x$, where x is atomic percent and is greater than or equal to 43 and less than or equal to 48.

* * * * *